US007441074B1

(12) United States Patent
Panigrahy et al.

(10) Patent No.: US 7,441,074 B1
(45) Date of Patent: Oct. 21, 2008

(54) METHODS AND APPARATUS FOR DISTRIBUTING ENTRIES AMONG LOOKUP UNITS AND SELECTIVELY ENABLING LESS THAN ALL OF THE LOOKUP UNITS WHEN PERFORMING A LOOKUP OPERATION

(75) Inventors: Rina Panigrahy, Sunnyvale, CA (US); Samar Sharma, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 2668 days.

(21) Appl. No.: 10/215,697

(22) Filed: Aug. 10, 2002

(51) Int. Cl.
*G06F 12/00* (2006.01)

(52) U.S. Cl. .......................... 711/108; 711/3; 711/154; 365/49.1

(58) Field of Classification Search .................. 711/3, 711/108, 154; 365/49, 226, 227, 49.1
See application file for complete search history.

(56) References Cited

U.S. PATENT DOCUMENTS

| | | | |
|---|---|---|---|
| 3,648,254 A | 3/1972 | Beausoleil |
| 4,296,475 A | 10/1981 | Nederlof et al. |
| 4,791,606 A | 12/1988 | Threewitt et al. |
| 4,996,666 A | 2/1991 | Duluk, Jr. |
| 5,088,032 A | 2/1992 | Bosack |
| 5,319,763 A | 6/1994 | Ho et al. |
| 5,339,076 A | 8/1994 | Jiang |
| 5,383,146 A | 1/1995 | Threewitt |
| 5,404,482 A | 4/1995 | Stamm et al. |
| 5,428,565 A | 6/1995 | Shaw |
| 5,440,715 A | 8/1995 | Wyland |
| 5,450,351 A | 9/1995 | Heddes |
| 5,481,540 A | 1/1996 | Huang |
| 5,515,370 A | 5/1996 | Rau |
| 5,528,701 A | 6/1996 | Aref |
| 5,651,099 A | 7/1997 | Konsella |
| 5,684,954 A | 11/1997 | Kaiserswerth et al. |
| 5,721,899 A | 2/1998 | Namba |
| 5,740,171 A | 4/1998 | Mazzola et al. |
| 5,781,772 A | 7/1998 | Wilkinson, III et al. |

(Continued)

OTHER PUBLICATIONS

Jon P. Wade and Charles G. Sodini, "A Ternary Content Addressable Search Engine," IEEE Journal of Solid-State Circuits, vol. 24, No. 4, Aug. 1989, pp. 1003-1013.

(Continued)

*Primary Examiner*—Stephen Elmore
(74) *Attorney, Agent, or Firm*—The Law Office of Kirk D. Williams

(57) ABSTRACT

Methods and apparatus are disclosed for distributing entries among lookup units and selectively enabling less than all of the lookup units when performing a lookup operation. Each of the lookup units is assigned a subset of the possible values of the entries and is programmed with the corresponding entries. In performing a lookup operation on a lookup word, only the lookup units possibly containing a matching entry are enabled which saves power and dissipates less heat. A lookup operation is then performed in the enabled lookup units to generate the lookup result. A lookup unit may correspond to an associative memory device, an associative memory bank, sets of entries within one or more associative memory devices or banks, a lookup control and a memory device, and/or any other lookup mechanism. In one implementation, the partitioning of elements is based on a Patricia tree representation of the possible entries.

50 Claims, 15 Drawing Sheets

U.S. PATENT DOCUMENTS

| | | | |
|---|---|---|---|
| 5,802,567 | A | 9/1998 | Liu et al. |
| 5,809,501 | A | 9/1998 | Noven |
| 5,829,004 | A | 10/1998 | Au |
| 5,841,874 | A | 11/1998 | Kempke et al. |
| 5,842,040 | A | 11/1998 | Hughes et al. |
| 5,848,416 | A | 12/1998 | Tikkanen |
| 5,852,569 | A | 12/1998 | Srinivasan et al. |
| 5,884,297 | A | 3/1999 | Noven |
| 5,898,689 | A | 4/1999 | Kumar et al. |
| 5,920,886 | A | 7/1999 | Feldmeier |
| 5,930,359 | A | 7/1999 | Kempke et al. |
| 5,956,336 | A | 9/1999 | Loschke et al. |
| 5,978,885 | A | 11/1999 | Clark, II |
| 6,000,008 | A | 12/1999 | Simcoe |
| 6,018,524 | A | 1/2000 | Turner et al. |
| 6,041,389 | A | 3/2000 | Rao |
| 6,047,369 | A | 4/2000 | Colwell et al. |
| 6,061,368 | A | 5/2000 | Hitzelberger |
| 6,067,574 | A | 5/2000 | Tzeng |
| 6,069,573 | A | 5/2000 | Clark, II et al. |
| 6,081,440 | A | 6/2000 | Washburn et al. |
| 6,091,725 | A | 7/2000 | Cheriton et al. |
| 6,097,724 | A | 8/2000 | Kartalopoulos |
| 6,115,716 | A | 9/2000 | Tikkanen et al. |
| 6,134,135 | A | 10/2000 | Andersson |
| 6,137,707 | A | 10/2000 | Srinivasan et al. |
| 6,141,738 | A | 10/2000 | Munter et al. |
| 6,148,364 | A | 11/2000 | Srinivasan et al. |
| 6,154,384 | A | 11/2000 | Nataraj et al. |
| 6,175,513 | B1 | 1/2001 | Khanna |
| 6,181,698 | B1 | 1/2001 | Hariguchi |
| 6,199,140 | B1 | 3/2001 | Srinivasan et al. |
| 6,219,748 | B1 | 4/2001 | Srinivasan et al. |
| 6,236,658 | B1 | 5/2001 | Essbaum et al. |
| 6,237,061 | B1 | 5/2001 | Srinivasan et al. |
| 6,240,003 | B1 | 5/2001 | McElroy |
| 6,240,485 | B1 | 5/2001 | Srinivasan et al. |
| 6,243,667 | B1 | 6/2001 | Kerr et al. |
| 6,246,601 | B1 | 6/2001 | Pereira |
| 6,285,378 | B1 | 9/2001 | Duluk, Jr. |
| 6,289,414 | B1 | 9/2001 | Feldmeier et al. |
| 6,295,576 | B1 | 9/2001 | Ogura et al. |
| 6,298,339 | B1 | 10/2001 | Bjornson |
| 6,307,855 | B1 | 10/2001 | Hariguchi |
| 6,308,219 | B1 | 10/2001 | Hughes |
| 6,374,326 | B1 | 4/2002 | Kansal et al. |
| 6,377,577 | B1 | 4/2002 | Bechtolsheim et al. |
| 6,389,506 | B1 | 5/2002 | Ross et al. |
| 6,430,190 | B1 | 8/2002 | Essbaum et al. |
| 6,434,662 | B1 | 8/2002 | Greene et al. |
| 6,526,474 | B1 | 2/2003 | Ross |
| 6,535,951 | B1 | 3/2003 | Ross |
| 6,542,391 | B2 | 4/2003 | Pereira et al. |
| 6,563,823 | B1 | 5/2003 | Przgienda et al. |
| 6,633,548 | B2* | 10/2003 | Bachmutsky et al. ........ 370/255 |
| 6,763,426 | B1 | 7/2004 | James et al. |
| 6,831,850 | B2* | 12/2004 | Pereira et al. .................. 365/49 |
| 6,963,924 | B1 | 11/2005 | Huang et al. |
| 7,114,026 | B1* | 9/2006 | Khanna ....................... 711/108 |
| 2002/0131432 | A1* | 9/2002 | Bachmutsky et al. ........ 370/408 |
| 2003/0005146 | A1 | 1/2003 | Miller et al. |
| 2003/0093616 | A1* | 5/2003 | Slavin ......................... 711/108 |
| 2004/0015752 | A1 | 1/2004 | Patella et al. |
| 2004/0100950 | A1 | 5/2004 | Basu et al. |
| 2004/0105422 | A1 | 6/2004 | Sahni et al. |
| 2005/0262295 | A1* | 11/2005 | Nataraj et al. ............... 711/108 |

OTHER PUBLICATIONS

Teuvo Kohonen, Content-Addressable Memories, 1987, pp. 128-129 and 142-144, Springer-Verlang, New York.

Brian Dipert, ed., "Special-purpose SRAMs Smooth the Ride," EDN, Jun. 24, 1999, pp. 93-104.

"What is a CAM (Content-Addressable Memory)?," Application Brief AB-N6, Rev. 2a, Music Semiconductors, Milpitas, CA, Sep. 30, 1998, 4 pages.

"Reading Out the Valid LANCAM Memory Entries," Application Brief AB-N4, Rev. 1a, Music Semiconductors, Milpitas, CA, Sep. 30, 1998, 4 pages.

"Extending the LANCAM Comparand," Application Brief AB-N3, Rev. 1.0a Draft, Music Semiconductors, Milpitas, CA, Sep. 30, 1998, 4 pages.

"Advantages of CAM in ASIC-Based Network Address Processing," Application Brief AB-N11, Rev. 1.2a Draft, Music Semiconductors, Milpitas, CA, Sep. 30, 1998, 4 pages.

"Virtual Memory Applications of the MU9C1480A LANCAM," Application Note AN-N3, Rev. 1a, Music Semiconductors, Milpitas, CA, Sep. 30, 1998, 12 pages.

"Using the MU9C1965A LANCAM MP for Data Wider than 128 Bits," Application Note AN-N19, Rev. 1a, Music Semiconductors, Milpitas, CA, Sep. 30, 1998, 16 pages.

"Fast IPv4 and IPv4 CIDR Address Translation and Filtering Using the MUAC Routing CoProcessor (RCP)," Application Note AN-N25, Rev. 0a, Music Semiconductors, Milpitas, CA, Oct. 1, 1998, 16 pages.

"Using MUSIC Devices and RCPs for IP Flow Recognition," Application Note AN-N27, Rev. 0, Music Semiconductors, Milpitas, CA, Oct. 21, 1998, 20 pages.

"Wide Ternary Searches Using Music CAMs and RCPs," Application Note AN-N31, Rev. 0, Music Semiconductors, Milpitas, CA, Apr. 13, 1999, 8 pages.

Donald R. Morrison, "Patricia—Practical Algorithm to Retrieve Information Coded in Alphanumeric," Journal of the ACM, vol. 15, No. 4, Oct. 1968, pp. 514-534.

Waldvogel et al., "Scalable High Speed IP Routing Lookups," Proc. SIGCOMM '97, ACM, 1997, pp. 25-36.

Lampson et al., "IP Lookups Using Multiway and Multicolumn Search," Proc. Infocom 98, Mar. 1998, 24 pages.

V. Srinivasan and George Varghese, "Faster IP Lookups using Controlled Prefix Expansion," ACM Sigmetrics Performance Evaluation Review, vol. 26 No. 1, Jun. 1998, p. 1-10.

Stefan Nilsson and Gunnar Karlsson, "Fast Address Look-up for Internet Routers," Proceedings of IEEE Broadband Communications, Apr. 1998, 12 pages.

William N. Eatherton, Hardware-Based Internet Protocol Prefix Lookups, Master's thesis, Sever Institute, Washington University, St. Louis, MO, May 1999, 109 pages.

Lampson et al., "IP Lookups Using Multiway and Multicolumn Search," IEEE Transactions on Networking, vol. 7, No. 3, Jun. 1999, pp. 324-334.

Lockwood et al., "Field Programmable Port Extender (FPX) for Distributed Routing and Queuing," Proceedings of the ACM/SIGDA international symposium on Field programmable gate arrays, Feb. 2000, pp. 137-144.

Ruiz-Sanchez et al., "Survey and Taxonomy of IP Address Lookup Algorithms," IEEE Network Magazine, vol. 15, No. 2, Mar./Apr. 2001, pp. 8-23.

Pankaj Gupta and Nick McKewon, "Algorithms for Packet Classification," IEEE Network Magazine, vol. 15, No. 2, Mar./Apr. 2001, pp. 24-32.

Iyer et al., "ClassiPI: An Architecture for Fast and Flexible Packet Classification," IEEE Network Magazine, vol. 15, No. 2, Mar./Apr. 2001, pp. 33-41.

Waldvogel et al., "Scalable High Speed Prefix Matching," ACM Transactions on Computer Systems, vol. 19, No. 4, Nov. 2001, pp. 440-482.

Devavrat Shah and Pankaj Gupta, "Fast Incremental Updates on Ternary-CAMs for Routing Lookups and Packet Classification," Proc. Hot Interconnects VIII, Aug. 2000, Stanford. IEEE Micro, vol. 21, No. 1, Jan./Feb. 2001, 9 pages.

Waldvogel et al., "Scalable Best Matching Prefix Lookups," PODC 98, ACM 1998.

Radia Perlman, Interconnections: Bridges, Routers, Switches, and Internetworking Protocols, Second Edition, Addison-Wesley, 2000, pp. 347-365.

Pankaj Gupta and Nick McKeown, "Algorithms for Packet Classification," IEEE Network Special Issue, Mar./Apr. 2001, vol. 15, No. 2, pp. 24-32 (reprint 29 pages).

Srinivasan et al., "Packet Classification Using Tuple Space Search," ACM Computer Communication Review, 1999. ACM SIGCOMM'99, Sep. 1999 (12 pages).

Srinivasan et al., "Fast and Scalable Layer Four Switching," ACM Computer Communication Review, 28(4):191-202, 1998. ACM SIGCOMM'98, Sep. 1998 (12 pages).

Stefan Nilsson and Gunnar Karlsson, "IP-Address Lookup Using LC-Tries," IEEE Journal on Selected Areas in Communications, Jun. 1999 (12 pages).

* cited by examiner

* E.G., WHEN: (A) THE OCCUPANCY LEVEL OF ONE OF THE LOOKUP UNITS EQUALS OR EXCEEDS A PREDETERMINED THRESHOLD VALUE; OR (B) THE DIFFERENCE IN THE NUMBER OF ENTRIES IN TWO OR MORE LOOKUP UNITS EQUALS OR EXCEEDS A PREDETERMINED THRESHOLD – IN OTHER WORDS, THE NUMBER OF ENTRIES IN EACH OF THE LOOKUP UNITS ARE NO LONGER APPROXIMATELY THE SAME

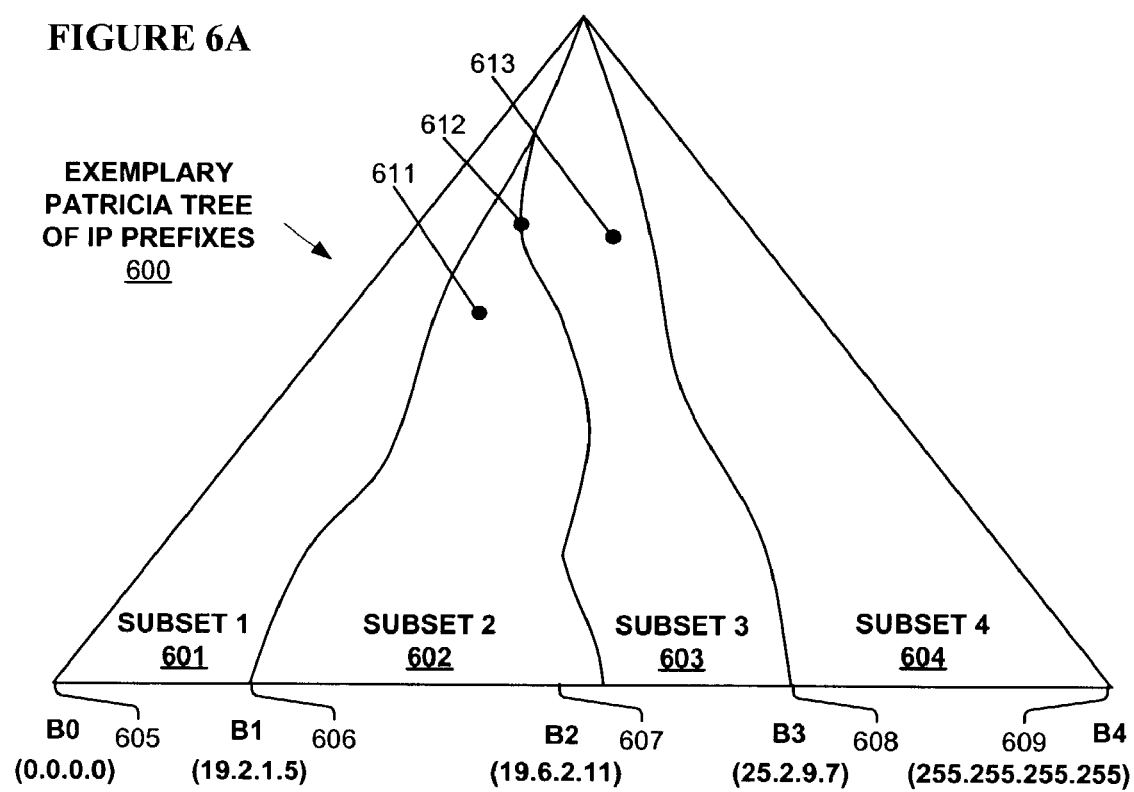

US 7,441,074 B1

METHODS AND APPARATUS FOR DISTRIBUTING ENTRIES AMONG LOOKUP UNITS AND SELECTIVELY ENABLING LESS THAN ALL OF THE LOOKUP UNITS WHEN PERFORMING A LOOKUP OPERATION

FIELD OF THE INVENTION

This invention especially relates to computer and communications systems, especially network routers and switches; and more particularly, the invention relates to distributing entries among lookup units, such as, but not limited to associative memory units and other memory devices, and selectively enabling less than all of the lookup units when performing a lookup operation.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Packet forwarding decisions and other packet operations are demanding parts of switch and router design. For example, IP forwarding requires a longest prefix match. In order to support large number of layer 3 prefixes (e.g., IP, IPX), four to eight ternary content-addressable memory (TCAM) chips are often used due to the number of addresses that need to be supported. A longest prefix match is determined by performing a lookup operation on each of the TCAM chips. However, CAMs and TCAMs are expensive in terms of power consumption and heat dissipation, and thus desired are new methods and apparatus for performing lookup operations.

SUMMARY OF THE INVENTION

Methods and apparatus are disclosed for distributing entries among lookup units and selectively enabling less than all of the lookup units when performing a lookup operation. One embodiment includes multiple lookups units for generating a lookup result based on a lookup value. Each of the multiple lookup units is programmed with a subset of the entries. One or more enable signal generators selectively enable less than all of the lookup units based on the lookup value or some other value. In one embodiment, a lookup unit is an associative memory unit. In one embodiment, an associative memory unit is an associative memory device. In one embodiment, an associative memory unit is an associative memory bank. In one embodiment, an associative memory unit is a set of entries in one or more associative memory banks or devices. In one embodiment, a lookup unit includes a lookup control and a memory device.

One embodiment also includes control logic for partitioning the entries into subsets of entries and for programming each of the lookup units with one of the subsets of entries. In one embodiment, each of the subsets of entries contains approximately the same number of entries. In one embodiment, control logic is configured to repartition the entries into different subsets.

In one embodiment, control logic is configured to perform the partitioning based on a Patricia tree representation of the entries. In one embodiment, a particular entry residing on a boundary between a first and the second subsets of the entries is included in both first and second lookup units. In one embodiment, the entries are repartitioned by adjusting a boundary between the first and second subsets of the entries. In one embodiment, the boundary is moved by determining a prefix left of the second subset and by setting the boundary to this prefix supplemented with ones. In one embodiment, the boundary is moved by determining a prefix right of the first subset and by setting the boundary to this prefix supplemented with zeros.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIGS. 6A-B are block diagrams of a mechanism used in one embodiment for partitioning and repartitioning the space of possible entries;

DETAILED DESCRIPTION

Figure 1:
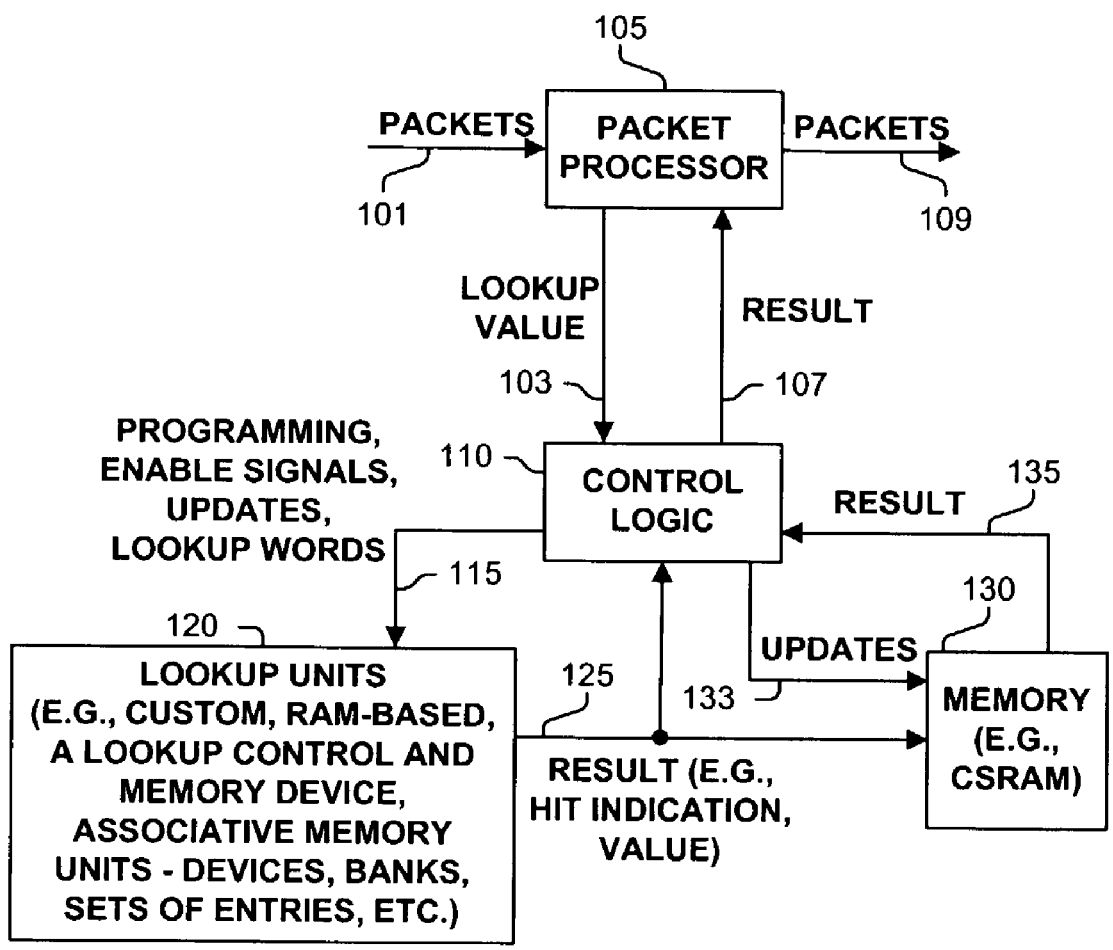
FIGS. 1, 2A-E and 3A-C are a block diagram of various exemplary embodiments for distributing entries among lookup units and selectively enabling less than all of the lookup units when performing lookup operations to produce results used in the processing of packets.

Systems and methods are disclosed for distributing entries among lookup units and selectively enabling less than all of the lookup units when performing lookup operations to produce results, which can then be used in the processing of packets or in any other operation. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

The term "lookup unit" is an extensible term which may include any mechanism for performing a lookup operation, such as, but not limited to an associative memory unit, custom circuitry, a RAM-based solution, a lookup control and memory device, etc. The term "associative memory unit" is an extensible term, and may include, but is not limited to such entities as one or more associative memory devices, banks, set of entries, etc.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data. The phrases "processing a packet" and "packet processing" typically refer to performing some steps or actions based on the packet, and which may or may not include modifying and/or forwarding the packet.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc.

The term "storage mechanism" includes any type of memory, storage device or other mechanism for maintaining instructions or data in any format. "Computer-readable medium" is an extensible term including any memory, storage device, storage mechanism, and other storage and signaling mechanisms including interfaces and devices such as network interface cards and buffers therein, as well as any communications devices and signals received and transmitted, and other current and evolving technologies that a computerized system can interpret, receive, and/or transmit. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, data base, and/or one or more or an organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" refers to all types of known or future developed associative memories, including, but not limited to binary and ternary content-addressable memories, hash tables, TRIE and other data structures, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units. Additionally, the use of a singular tense of a noun is non-limiting, with its use typically including one or more of the particular item rather than just one (e.g., the use of the word "memory" typically refers to one or more memories without having to specify "memory or memories," or "one or more memories" or "at least one memory", etc.) Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modify or not modifying the coupled signal or communicated information. The term "subset" is used to indicate a group of all or less than all of the elements of a set. Moreover, the term "or" is used herein to identify a selection of one or more, including all, of the conjunctive items.

Methods and apparatus are disclosed for distributing entries among lookup units and selectively enabling less than all of the lookup units when performing a lookup operation. In one embodiment, each of the lookup units is assigned a subset of the possible values of the entries and is programmed with the corresponding entries. In one embodiment, a lookup operation is then performed in the enabled lookup unit or units based on the lookup word to generate the lookup result. Each of the lookup units may correspond to any mechanism for performing a lookup operation, such as, but not limited to an associative memory unit (e.g., one or more associative memories, associative memory banks, and/or sets of entries within one or more associative memory devices or banks), custom circuitry, a RAM-based solution, a lookup control and memory device, etc. In one embodiment, the enabling processes is hierarchical. For example, one of multiple lookup units within a single lookup unit within a set of lookup units is enabled. In one embodiment, the partitioning of elements is based on a Patricia tree representation of the possible entries.

In performing a lookup operation on a lookup word, only the lookup units possibly containing a matching entry are enabled which saves power and dissipates less heat. For example, the power consumption of one embodiment of a lookup engine built with TCAMs approximates that of a conventional SRAM-based lookup engine. Also, one embodiment requires approximately two to three watts of power to operate per TCAM, wherein a similar configuration using the conventional technique of searching all TCAM entries requires approximately fourteen watts of power per TCAM.

One embodiment includes an apparatus for use in generating lookup results, the apparatus comprising: a plurality of lookup units for generating a lookup result based on a lookup value, each of the plurality of lookup units including a different one of a plurality subsets of a plurality of entries; and an enable signal generator, coupled to each of the plurality of lookup units, for selectively enabling less than all of the plurality of lookup units based on the lookup value.

In one embodiment, each of the plurality of lookup units includes an associative memory unit. In one embodiment, the associative memory unit is an associative memory device. In one embodiment, the associative memory unit is an associative memory bank. In one embodiment, a single associative memory device includes each of the plurality of lookup units. In one embodiment, each of the plurality of lookup units corresponds to one or more entries within an associative memory device. In one embodiment, each of the plurality of lookup units includes a lookup control and a memory device. One embodiment comprises control logic for partitioning the plurality of entries into the plurality of subsets of the plurality of entries, and for programming each of the plurality of lookup units with said different one of the plurality of subsets of the plurality of entries. In one embodiment, a particular entry of the plurality of entries is included in only one of the plurality of lookup units. In one embodiment, a particular entry of the plurality of entries is included in at most two of the plurality of lookup units. In one embodiment, each of the plurality of subsets of the plurality of entries contains approximately the same number of entries. In one embodiment, said control logic is configured to add entries to one or more of the plurality of subsets. In one embodiment, said control logic is configured to repartition the plurality of entries into a different plurality of subsets based on an occupancy level of one of the plurality of subsets of the plurality of entries. In one embodiment, said control logic is configured to perform said partitioning based on a Patricia tree representation of the plurality of entries. In one embodiment, a first lookup unit of the plurality of lookup units includes a first subset of the plurality of entries and a second lookup unit of the plurality of lookup units includes a second subset of the plurality of entries; and wherein a particular entry residing on a boundary between the first and the second subsets of the plurality of subsets of the plurality of entries is included in both the first and second lookup units. In one embodiment, said control logic is configured to repartition the plurality of entries into a different plurality of subsets based on an occupancy level of one of the plurality of subsets of the plurality of entries. In one embodiment, said repartitioning the plurality of entries includes adjusting a boundary between a first and a second subsets of the plurality of entries. In one embodiment, the first subset is left of the second subset Patricia tree representation, and wherein said adjusting the boundary includes determining a prefix left of the second subset and setting the boundary to the prefix supplemented with ones. In one embodiment, the first subset is left of the second subset Patricia tree representation, and wherein said adjusting the boundary includes determining a prefix right of the first subset and setting the boundary to the prefix supplemented with zeros. In one embodiment, said control logic communicates an enable representation of said partitioning to the enable signal generator.

One embodiment includes a method for use in determining lookup results, the method comprising: programming each of a plurality of lookup units with a different set of entry values; selectively enabling less than all of the plurality of lookup units; and performing a lookup operation using a lookup word on said selectively enabled lookup units.

In one embodiment, each of the plurality of lookup units includes an associative memory unit. In one embodiment, the associative memory unit is an associative memory device. In one embodiment, the associative memory unit is an associative memory bank. In one embodiment, a single associative memory device includes each of the plurality of lookup units. In one embodiment, each of the plurality of lookup units corresponds to one or more entries within an associative memory device. One embodiment comprises providing the lookup word to each of the plurality of lookup units. One embodiment comprises providing the lookup word to said selectively enabled associative memory devices. In one embodiment, each of the plurality of lookup units includes a lookup control and a memory device. One embodiment comprises: identifying a lookup value; wherein said selectively enabling is performed based on a first subset of the lookup value; and wherein the lookup word includes a second subset of the lookup value. In one embodiment, said selectively enabling is performed based on the lookup word. In one embodiment, each of the plurality of lookup units is programmed with approximately the same number of values from the set of entry values.

One embodiment includes a method for use in generating lookup results, the method comprising: partitioning a space of possible values into a plurality of subsets of the space; programming each of a plurality of lookup units with corresponding to one of the plurality of subsets of the space; identifying a lookup value; selectively enabling less than all of the plurality of lookup units based on the lookup value; and providing a lookup word, based on the lookup value, to at least said selectively enabled lookup units.

In one embodiment, each of the plurality of lookup units includes an associative memory unit. In one embodiment, the associative memory unit is an associative memory device. In one embodiment, the associative memory unit is an associative memory bank. In one embodiment, a single associative memory device includes each of the plurality of lookup units. In one embodiment, each of the plurality of lookup units corresponds to one or more entries within an associative memory device. One embodiment comprises providing the lookup word to each of the plurality of lookup units. One embodiment comprises providing the lookup word to said selectively enabled associative memory devices. In one embodiment, each of the plurality of lookup units includes a lookup control and a memory device. One embodiment comprises programming an enable signal generator based on ranges of the plurality of subsets of the space. One embodiment comprises programming a plurality of enable signal generators based on ranges of the plurality of subsets of the space. In one embodiment, each of the plurality of enable signal generators corresponds to a different one of the plurality of lookup units. In one embodiment, said partitioning the space includes deriving a Patricia tree representation including the plurality of entries. One embodiment comprises repartitioning the space of possible values into the plurality of subsets of the space including modifying a boundary between a first and a second subsets of the space. In one embodiment, the first subset is left of the second subset Patricia tree representation, and wherein said adjusting the boundary includes determining a prefix left of the second subset and setting the boundary to the prefix supplemented with ones. In one embodiment, the first subset is left of the second subset Patricia tree representation, and wherein said adjusting the boundary includes determining a prefix right of the first subset and setting the boundary to the prefix supplemented with zeros.

One embodiment includes apparatus for use in generating lookup results, the apparatus comprising: means for partitioning a space of possible values into a plurality of subsets of the space; means for programming each of a plurality of means for performing a lookup operation with entries corresponding to one of the plurality of subsets of the space; means for selectively enabling less than all of the plurality of said means for performing a lookup operation based on a lookup value; and means for performing a lookup operation in said selectively enabled means for performing a lookup operation based on the lookup value. In one embodiment, said means for partitioning the space includes means for deriving a Patricia tree representation including the plurality of entries. One embodiment comprises means for repartitioning the space of possible values into the plurality of subsets of the space includes means for modifying a boundary between a first and a second subsets of the space.

FIG. 1 illustrates one embodiment of a system, which may be part of a router or other communications or computer system, for distributing entries among lookup units and selectively enabling less than all of the lookup units when performing lookup operations to produce results which can be used in the processing of packets. In one embodiment, control logic 110, via signals 115, programs and updates lookup units 120. Typically, the possible space of entries is partitioned and repartitioned as needed, and each lookup unit 120 is programmed with entries corresponding to one of the partitions of the space. In one embodiment, control logic 110 also programs memory 130 via signals 133. In one embodiment, control logic 110 includes custom circuitry, such as, but not limited to discrete circuitry, ASICs, memory devices, processors, etc.

In one embodiment, packets 101 are received by packet processor 105. In addition to other operations (e.g., packet routing, security, etc.), packet processor 105 typically generates one or more items, including, but not limited to one or more netflow identifiers (typically referred to herein as "netflows") based on one or more fields of one or more of the received packets 101 and possibly from information stored in data structures or acquired from other sources. Packet processor 105 typically generates a lookup value 103 which is provided to control logic 110 for deriving and providing a lookup word and enable indications via signals 115 to lookup units 120. Typically, less than all of the lookup units 120 are enabled based the received enable indications, and these enabled lookup units 120 generate a result 125 based on the received lookup word. In one embodiment, result 125 is used by memory 130 to produce result 135. Control logic 110 then relays result 107, based on result 125 and/or result 135, to packet processor 105. In response, one or more of the received packets are manipulated and forwarded by packet processor 105 as indicated by packets 109.

Figure 2A:
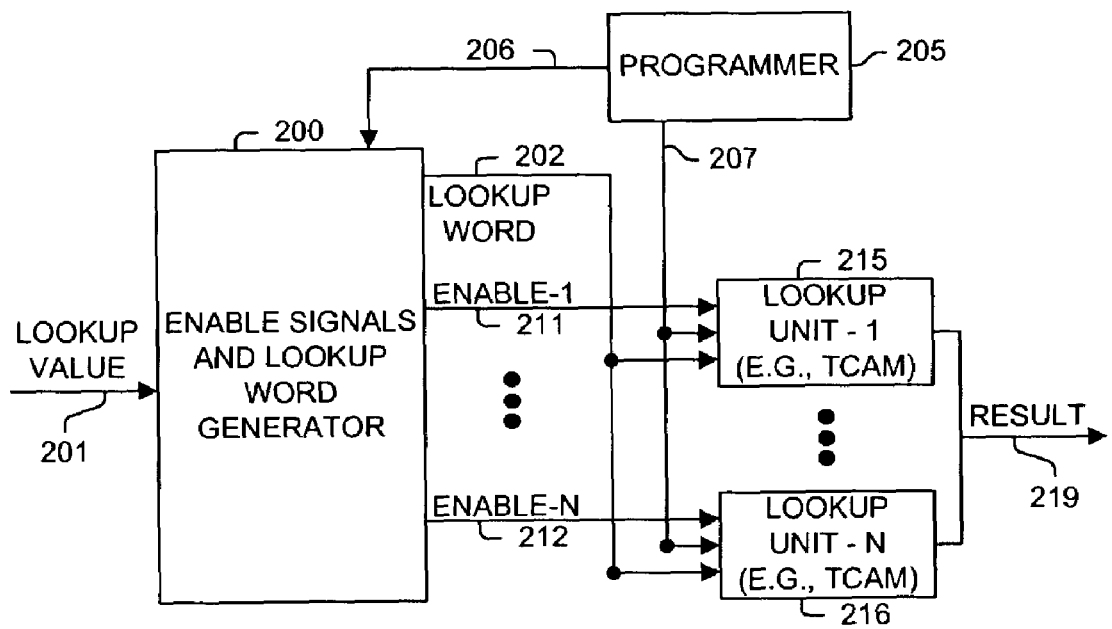

FIG. 2A illustrates a system used in one embodiment for distributing entries among lookup units 215-216 and selectively enabling less than all of the lookup units 215-216 when performing a lookup operation. Programmer 205 (e.g., discrete circuitry, ASIC, or processor, etc.) partitions (or receives such partitioning) the possible space of lookup entries to be programmed into the N lookup units 215-216. Programmer 205, via signals 207, programs each of the lookup units 215-216 with entries corresponding to its assigned partition. Programmer 205, via signals 206, typically programs enable signals and lookup word generator 200 with values corresponding to the partitions so that only the appropriate one or more lookup units 215-216 will be enabled during a lookup operation. In one embodiment, programmer 205 repartitions the possible space or received the updated partitioning, and accordingly updates lookup units 215-216 and/or enable signals and lookup word generator 200.

In one embodiment, in performing a lookup operation, a lookup value 201 is received by enable signals and lookup word generator 200, which then generates lookup word 202 to lookup units 215-216. Enable signals and lookup word generator 200 further generates enable signals 211-212 to selectively enable only those lookup units 215-216 which possibly contain a matching value to lookup word 202. The enabled one or more lookup units 215-216 then perform the lookup operation based on lookup word 202 to generate result 219. In one embodiment, lookup word 202 is provided to all lookup units 215-216. In one embodiment, lookup word 202 is provided only to the selectively enabled lookup units 215-216.

Figure 2B:
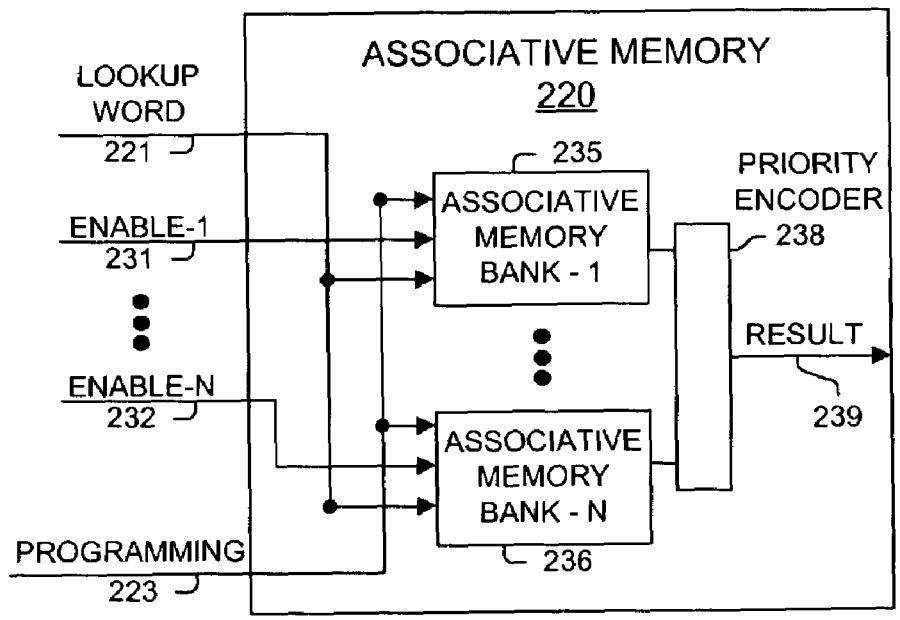

FIG. 2B illustrates an associative memory 220 used in one embodiment for distributing entries among associative memory units 235-236 and selectively enabling less than all of the associative memory units 235-236 when performing a lookup operation. Programming signals 223 are used to program each of the associative memory banks 235-236 with entries corresponding to its assigned partition. Enable indications 231-232 are received and relayed to the corresponding associative memory banks 235-236. Of course, other embodiments may use different techniques to identify the enable status of associative memory banks 235-236.

In one embodiment, a lookup word 221 is received and provided to each of the associative memory banks 235-236, while in one embodiment, lookup word 221 is provided to only the selectively enabled associative memory banks 235-

236. The enabled associative memory banks 235-236 then perform the lookup operation based on lookup word 221 to generate one or more hits, which typically are provided to priority encoder logic 238 to selectively produce result 239.

Figure 2C:
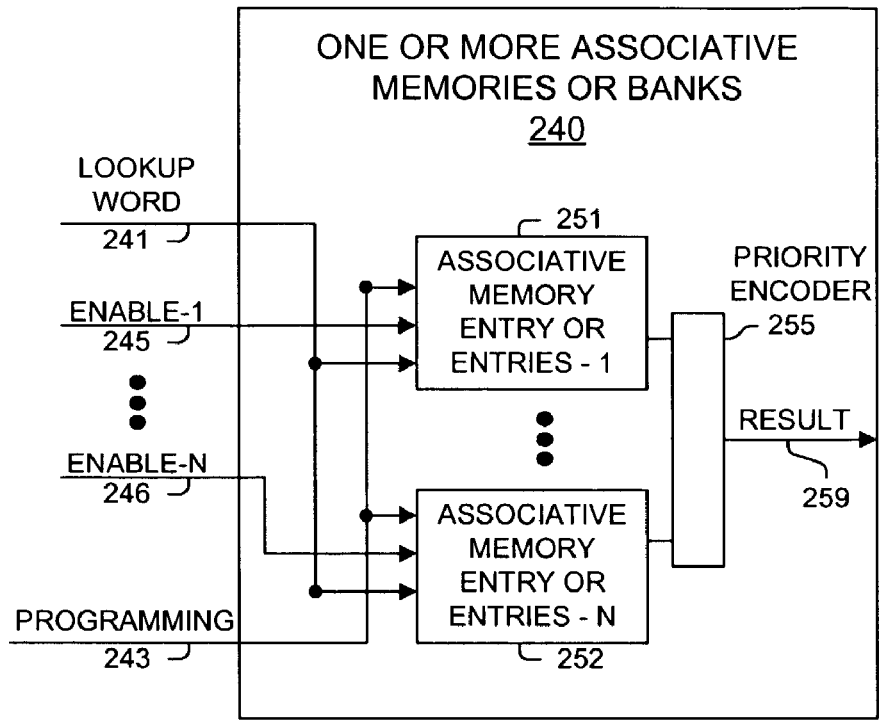

FIG. 2C illustrates one or more associative memories or banks 240 used in one embodiment for distributing entries among associative memory units and selectively enabling less than all of the associative memory units when performing a lookup operation. Programming signals 243 are used to program each of the associative memory entry or sets of entries 251-252 with values corresponding to its assigned partition. Enable indications 245-246 are received and provided to their corresponding associative memory entry or entries 251-252. Of course, other embodiments may use different techniques to identify the enable status of associative memory entry or entries 251-252.

A lookup word 241 is received and provided to each of the associative memory entries 251-252, while in one embodiment, lookup word 241 is provided to only the selectively enabled associative memory entries 251-252. The enabled one or more associative memory entries 251-252 then perform the lookup operation based on lookup word 241 to generate one or more hits, which typically are provided to priority encoder logic 255 to selectively produce result 259.

Figure 2D:
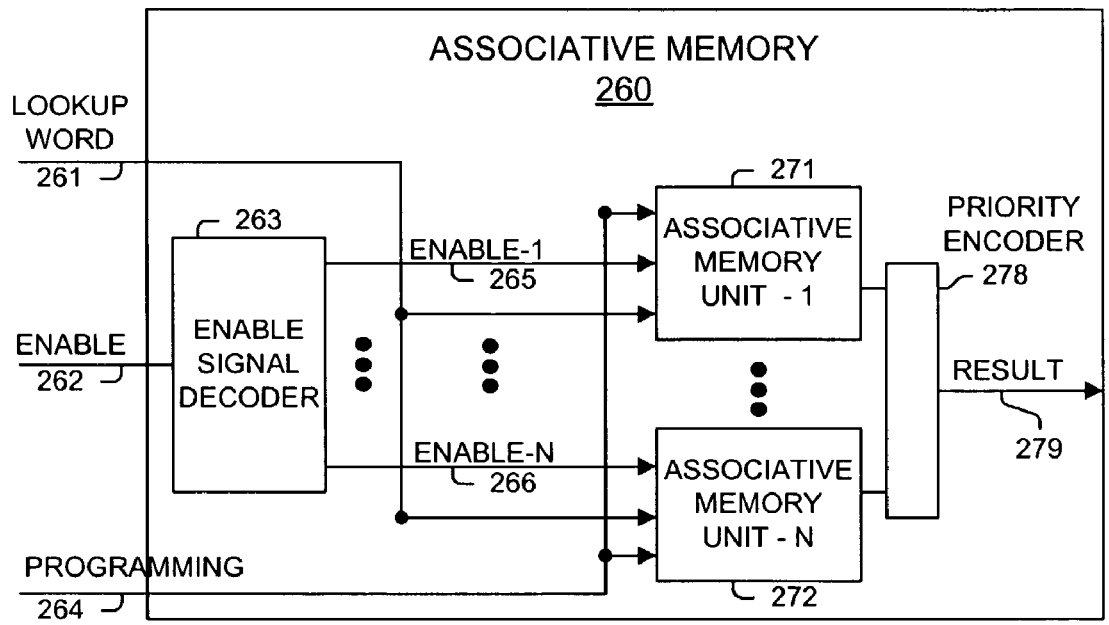

FIG. 2D illustrates an associative memory 260 used in one embodiment for distributing entries among associative memory units 271-272 and selectively enabling less than all of the associative memory units 271-272 when performing a lookup operation. Programming signals 264 are used to program each of the associative memory units 271-272 (e.g., banks or sets of one or more entries) with entries corresponding to its assigned partition. An enable indication 262 is received by enable signal decoder 263 which generates enable indication signals 265-266 to each of the associative memory units 271-272. A lookup word 261 is received and provided to each of the associative memory units 271-272, while in one embodiment, lookup word 261 is provided to only the selectively enabled associative memory units 271-272. The enabled associative memory units 271-272 then perform the lookup operation based on lookup word 261 to generate one or more hits, which typically are provided to priority encoder logic 278 to selectively produce result 279.

Figure 2E:
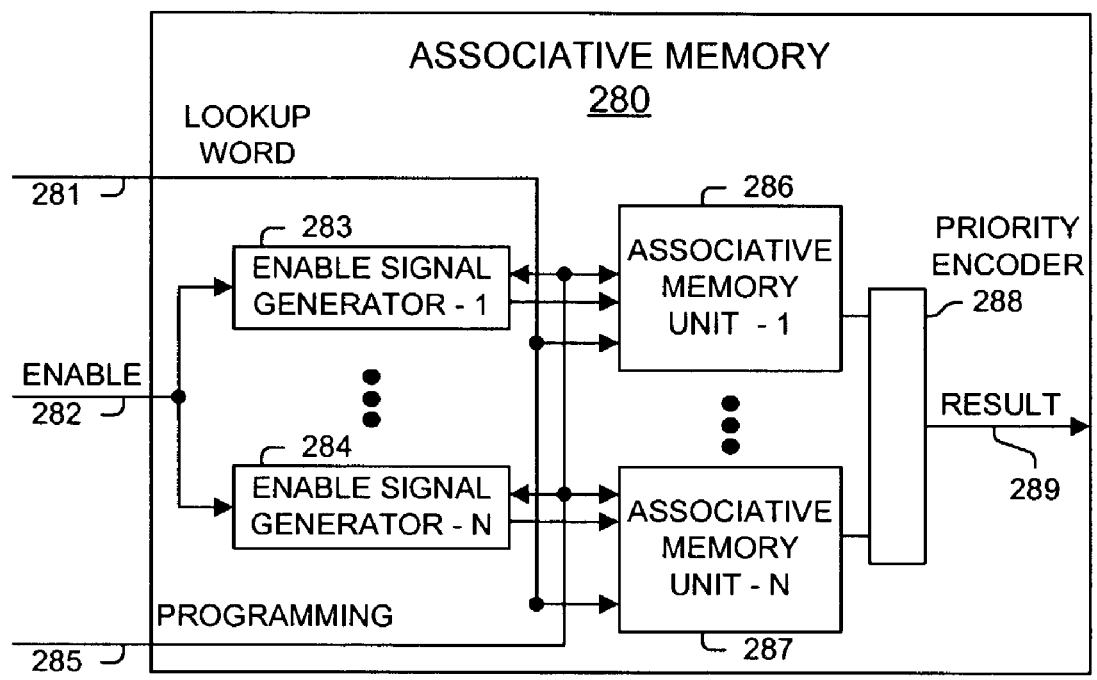

FIG. 2E illustrates yet another of an unlimited number of configurations of an associative memory 280 used in one embodiment for distributing entries among associative memory units 286-287 and selectively enabling less than all of the associative memory units 286-287 when performing a lookup operation. Programming signals 285 are used to program each of the associative memory units 286-287 (e.g., banks or sets of one or more entries) with entries corresponding to its assigned partition, and to program each of the enable signal generators 283-284 with partition identification information. In one embodiment, each partition id corresponds to a value. In one embodiment, a partition id may be a prefix. In one embodiment, a partition id may correspond to a masked value, which may be especially useful in enabling more than one of the associative memory units 286-287 for a particular search. For example, a completely masked partition id would typically enable the corresponding one of the associative memory units 286-287 for all lookup operations. Also, partition ids could be assigned using one or more masked bits to allow easy simultaneous enabling of two or more associative memory units 286-287, such as those corresponding to neighboring partitions or those including entries corresponding to partition boundaries.

An enable indication 282 is received and distributed to each of the enable signal generators 283-284, which, based on their static or dynamic programming of their corresponding partition of the space, enable their corresponding associative memory unit 286-287 if their programmed partition identification matches the received enable indication 282. A lookup word 281 is received and provided to each of the associative memory units 286-287, while in one embodiment, lookup word 281 is provided to only the selectively enabled associative memory units 286-287. The enabled associative memory units 286-287 then perform the lookup operation based on lookup word 281 to generate one or more hits, which typically are provided to priority encoder logic 288 to selectively produce result 289.

Figure 3A:
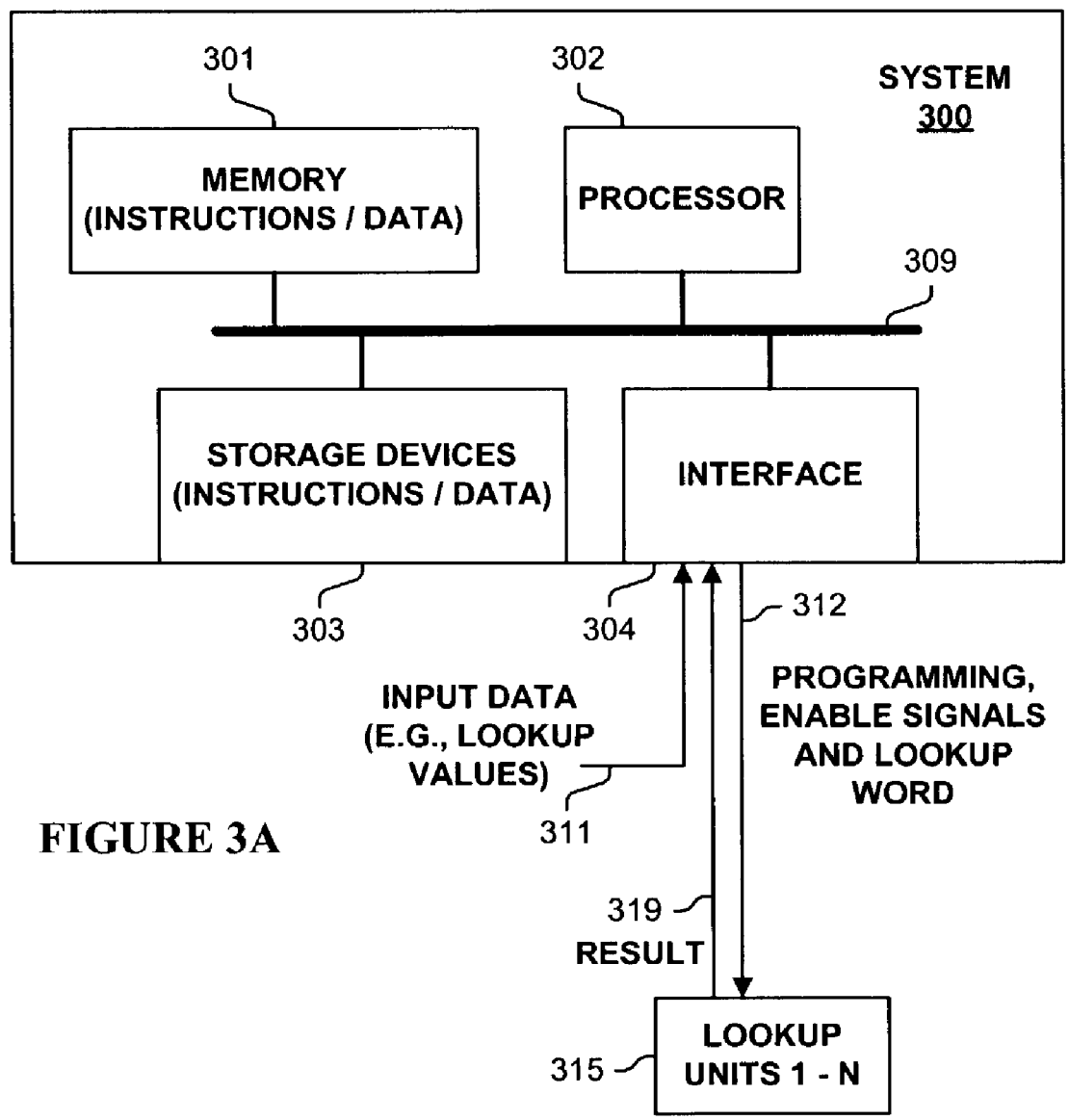

FIG. 3A illustrates a system 300, which may be part of a router or other communications or computer system, used in one embodiment for distributing entries among lookup units and selectively enabling less than all of the lookup units when performing a lookup operation. In one embodiment, system 300 includes a processor 301, memory 302, storage devices 303, and interface 304, which are coupled via one or more communications mechanisms 309 (shown as a bus for illustrative purposes).

Various embodiments of system 300 may include more or less elements. The operation of system 300 is typically controlled by processor 301 using memory 302 and storage devices 303 to perform one or more tasks or processes, such as programming or performing a lookup operation using lookup units 315. Memory 302 is one type of computer-readable medium, and typically comprises random access memory (RAM), read only memory (ROM), flash memory, integrated circuits, and/or other memory components. Memory 302 typically stores computer-executable instructions to be executed by processor 301 and/or data which is manipulated by processor 301 for implementing functionality in accordance with one embodiment of the invention. Storage devices 303 are another type of computer-readable medium, and typically comprise solid state storage media, disk drives, diskettes, networked services, tape drives, and other storage devices. Storage devices 303 typically store computer-executable instructions to be executed by processor 301 and/or data which is manipulated by processor 301 for implementing functionality in accordance with one embodiment of the invention.

In one embodiment, system 300 partitions and possibly repartitions a space of possible entries and assigns each partition to a particular one of the lookup units 315. System 300 then programs each of the lookup units with the subset of entries corresponding to their assigned partition.

In one embodiment, system 300 is also used in performing lookup operations on a lookup word. In one embodiment, system 300 receives the lookup word via input data 311. In one embodiment, system 300 generates the lookup word. System 300 then provides enable signals and the lookup word, via signals 312, to lookup units 315. The enabled lookup units 315 then perform a lookup operation on the lookup word and typically return the result 319 to system 300.

Figure 3B:
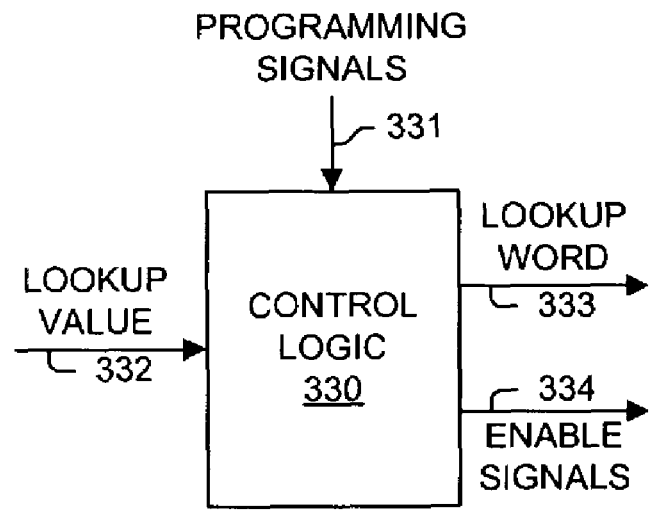

FIG. 3B illustrates control logic 330 used in one embodiment to generate a lookup word 333 and enable signals 334. Control logic 330 receives programming signals 331 to indicate the partitioning of the possible space of lookup words among lookup units. In response to receiving a lookup value 332, control logic 330 generates lookup word 333 which may include all or a part of lookup value 332. Also, control logic 330, based on its received programming indications and lookup value 332, generates enable signals 334 for selectively enabling the lookup units.

Figure 3C:
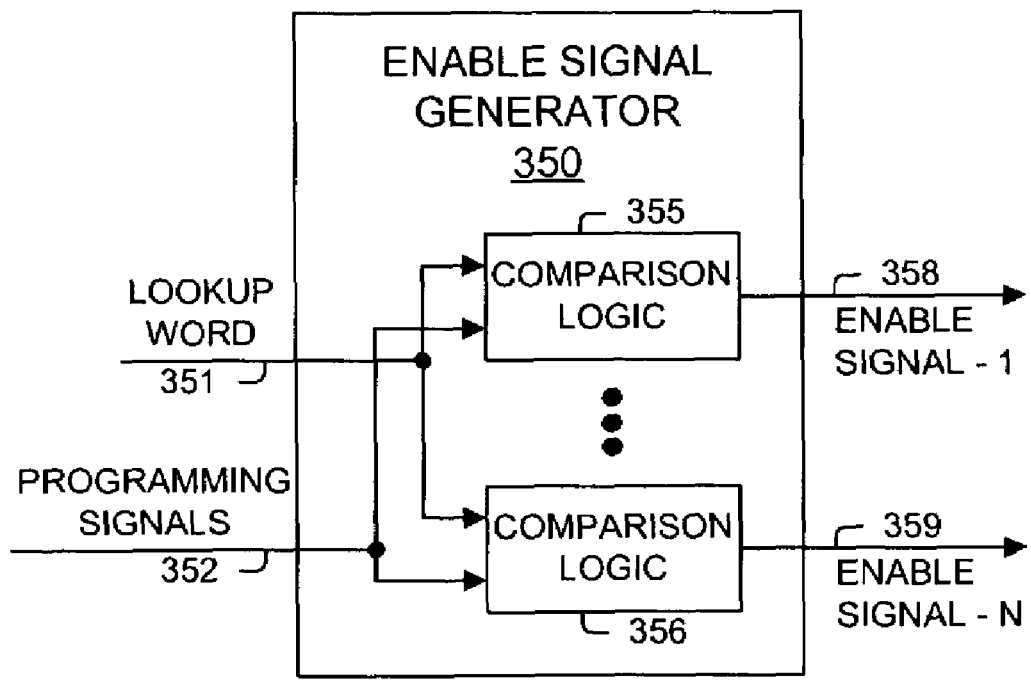

FIG. 3C illustrates an enable signal generator 350 used in one embodiment to generate enable signals 358-359 for selectively enabling one or more lookup units. Comparison logic 355-356 are programmed based on received programming signals 352 to typically identify a range corresponding to each of the lookup units. In response to receiving lookup word 351, comparison logic 355-356, based on their respective programming, generate enable signals 358-359 to selectively enable the appropriate lookup units.

Figure 4:
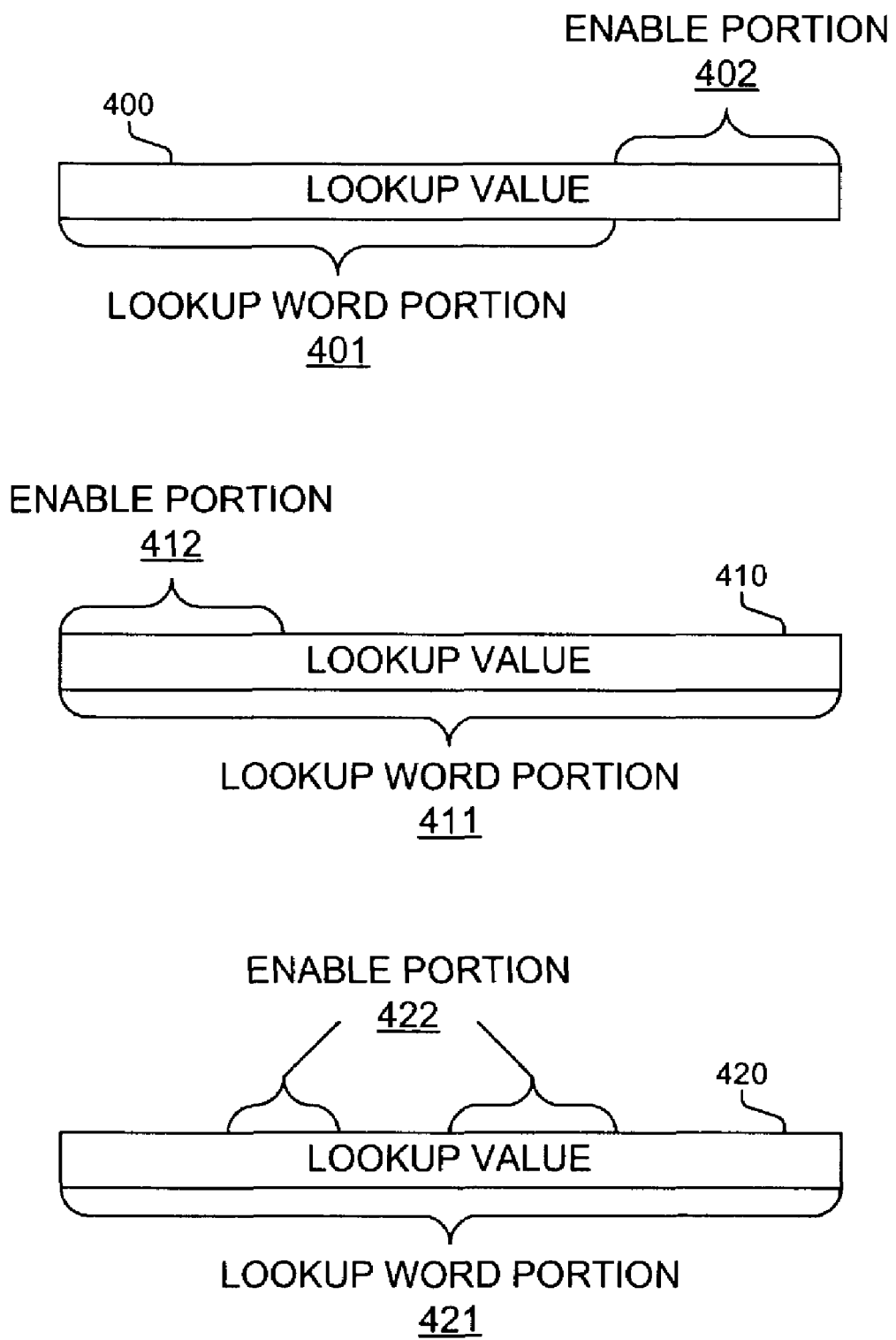
FIG. 4 illustrates block diagrams of various exemplary organizations of a lookup value and enable and lookup word portions thereof as used in some embodiments.

FIG. 4 illustrates block diagrams of various exemplary organizations of a lookup value and enable and lookup word portions thereof as used in some embodiments. Note, these block diagrams are only exemplary configurations, as there are an unlimited number of configurations that could be used in an embodiment. In one embodiment, lookup value 400 is partitioned into a lookup word portion 401 and an enable portion 402. In one embodiment, the entire lookup value 410 corresponds to lookup word portion 411, and enable portion 412 includes a subset of lookup value 410. In one embodiment, the entire lookup value 420 corresponds to lookup word portion 421, and enable portion 422 includes a subset of lookup value 420 aggregated from different fields or bits within lookup value 420.

Figure 5A:
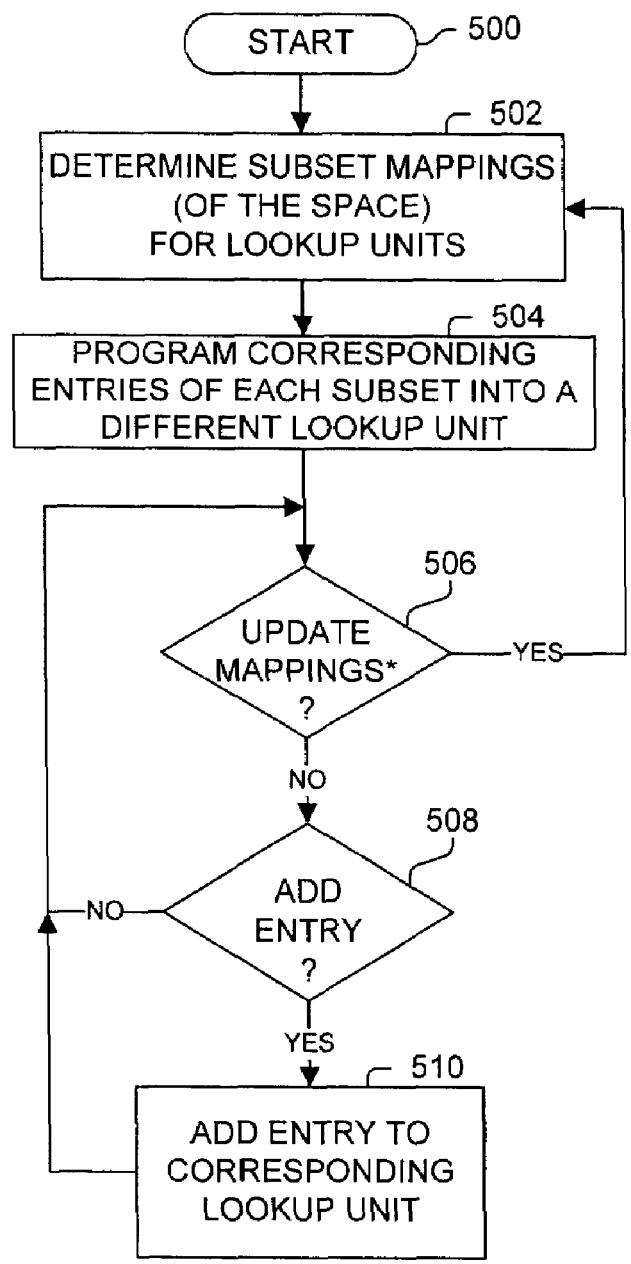
FIG. 5A illustrates a process used in one embodiment for partitioning the entries and programming lookup units accordingly.

FIG. 5A illustrates a process used in one embodiment for partitioning the entries programming lookup units accordingly. Processing beings with process block 500, and proceeds to process block 502, wherein the subset mapping for the lookup units are determined. Next, in process block 504, the lookup units are programmed with the corresponding entries. As determined in process block 506, if and when the mappings require updating, such as when the occupancy of one of the associative memory equals or exceeds a predetermined threshold value or the difference in the number of entries in two or more lookup units equals or exceeds a predetermined threshold, then processing returns to process block 502 to update the mappings and to subsequently move any entries as required. Otherwise, as determined in process block 508, if there is an entry to add, then the entry is added to the corresponding lookup unit in process block 510, and processing returns to process block 506.

Figure 5B:
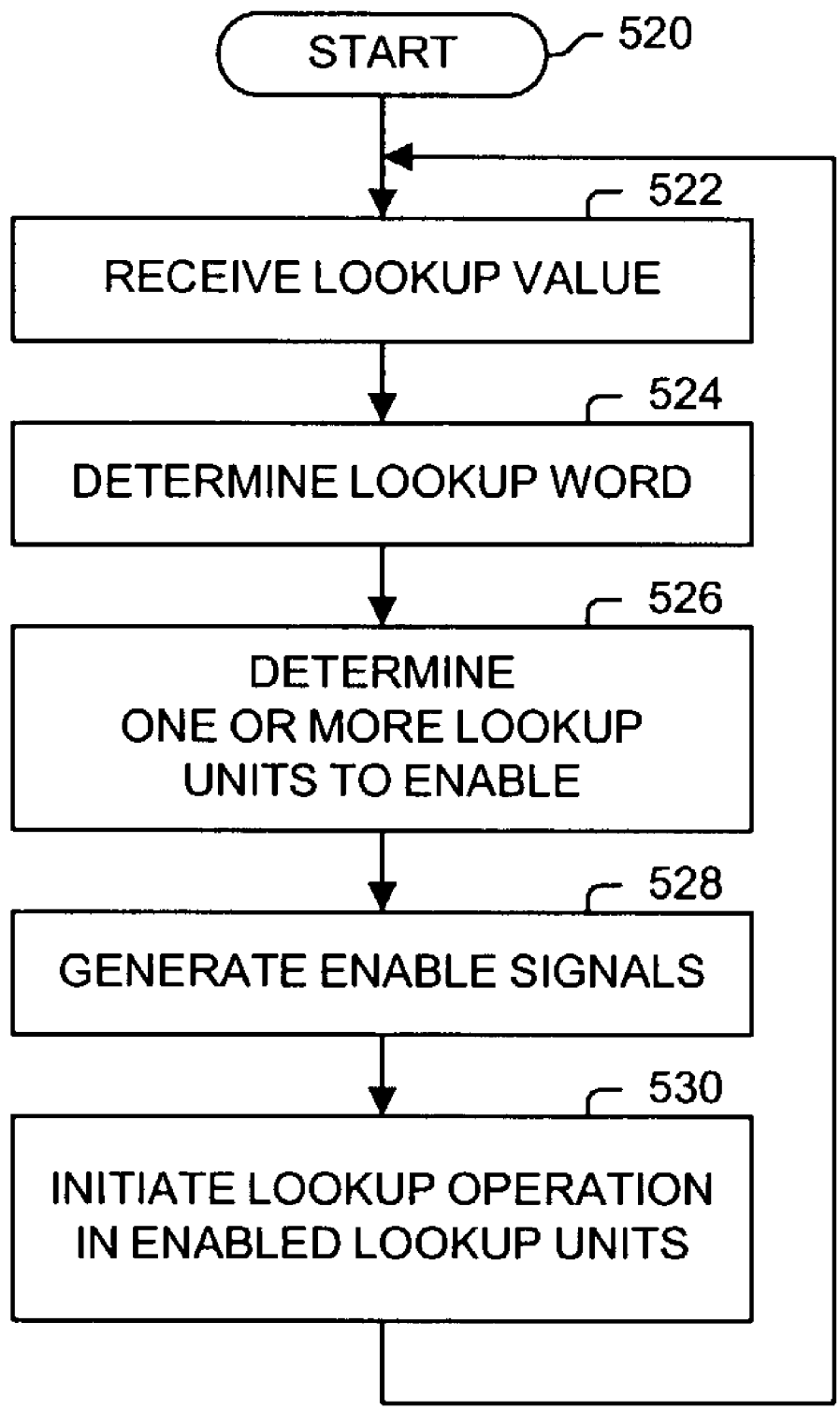
FIG. 5B illustrates a process used in one embodiment for enabling less than all of the lookup units and performing a lookup operation thereon.

FIG. 5B illustrates a process used in one embodiment for enabling less than all of the lookup units and performing a lookup operation thereon. Processing begins with process block 520, and proceeds to process block 522, wherein a lookup value is received. Next, in process block 524, the lookup word is determined based on the received lookup value. In process block 526, one or more lookup units are determined to be enabled, and in process block 528, the appropriate enabling signal are provided to the lookup units to enable the appropriate ones. Then, in process block 530, a lookup operation using the lookup word is initiated on the enabled lookup units to produce a result. Processing returns to process block 522.

Figure 6B:
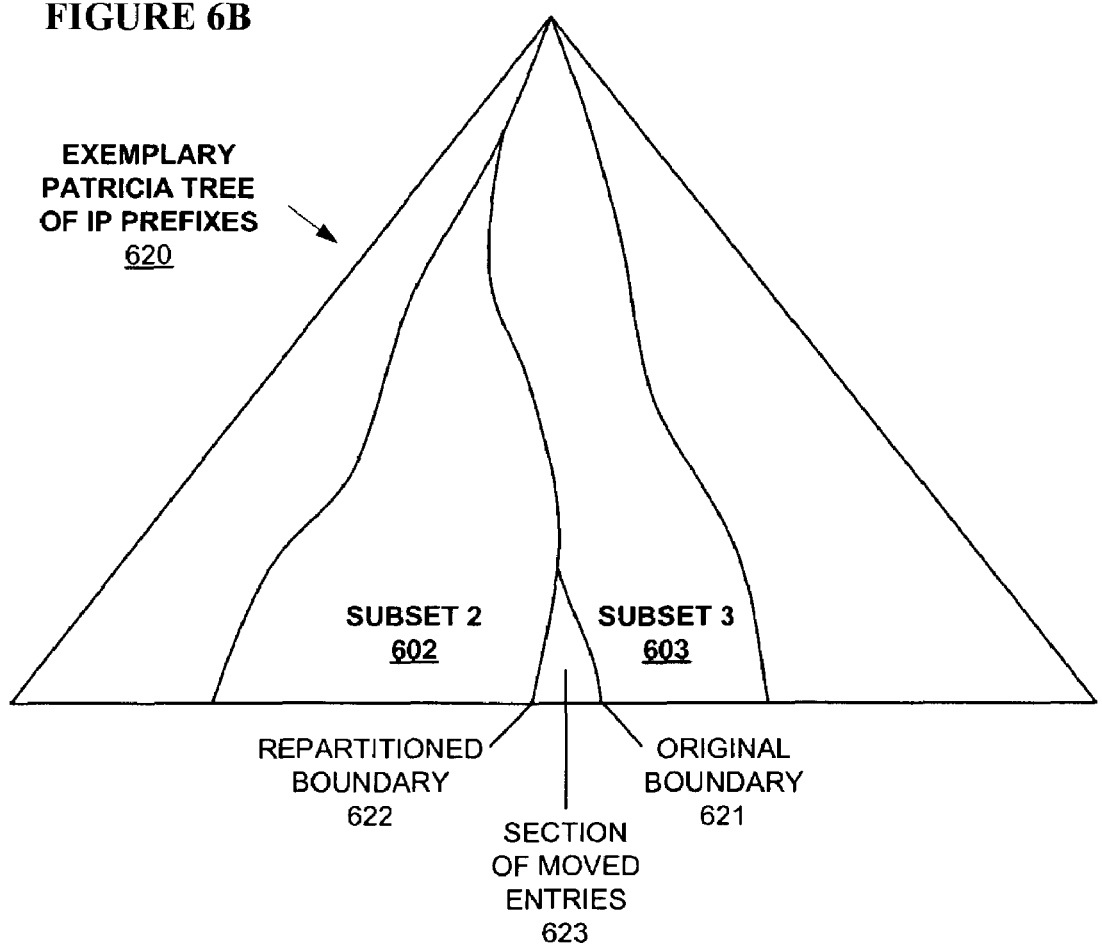

FIGS. 6A-B are block diagrams of a mechanism used in one embodiment for partitioning and repartitioning the space of possible entries using a Patricia tree. Turning to FIG. 6A, illustrated is an exemplary Patricia tree of Internet Protocol (IP) prefixes 600. In this example, the space of the Patricia tree is partitioned into four subsets 601-604, with boundary points 605-609. Three entries 611-613 are shown. Entry 611 resides in subset 2 (602). Entry 613 resides in subset 3 (603). Entry 612 lies on the boundary between subsets 2 and 3 (602-603) and therefore resides in both of these subsets 602-603.

In one embodiment, a prefix P* falls in a range [a, b] if the range [P0 . . . 0, P1 . . . 1] intersects with the range [a, b]. Some prefixes can fall into multiple ranges. For example, the prefix **** falls in all ranges. However the number of such prefixes will be few, with the exact number being a function of the width of an lookup unit entry and the number of partitions. In one embodiment, the number of prefixes is at most a product of the width of an lookup unit entry and the number of common boundaries (e.g., the number of partitions minus one.) One mechanism to determine if a prefix P* falls only in a single range [a, b] is to check a <P0 . . . 0, P1 . . . 1<b This will ensure that P* can not fall into any other range, because the ranges are disjoint.

In one embodiment, the ranges are selected in such a way that about an equal number of prefixes fall into each partition, with each partitioning of prefixes being placed in a different lookup unit. Those entries that are in multiple partitions will be placed in a corresponding number of lookup units. In one embodiment, such as the partitioning the entries using a Patricia tree as illustrated in FIG. 6A, any prefix that falls into multiple ranges must be on the path from one of these boundaries to the root. Otherwise, it will strictly lie in the interior of one of the regions carved out by these paths (e.g., boundaries). In other words, if a prefix p does not lie on any boundary, then there is some partition that p is "strictly to the right of" the boundary path from the endpoint of the boundary to root and/or "strictly to the left of" an adjoining boundary path from its endpoint to the root.

During updates, the boundaries can be moved to adjust the number of entries programmed into each lookup units, such as if one of the lookup units is becoming full, the number of entries in each partition or subset varies too greatly, or even to redistribute entries based on traffic patterns, etc. As shown in FIG. 6B, the position of original boundary 621 of exemplary Patricia tree of Internet Protocol (IP) prefixes 620 is moved to the repartitioned boundary 622, and any entries in section 623 are moved from subset 2 (602) to subset 3 (603).

In one embodiment, a number of entries in the lookup unit for each partition are reserved for entries that possibly would fall on a boundary of the partition. During an insert operation, if the entry to be inserted falls on a boundary of a partition, then it is added to each of the corresponding lookup units. If it does not fall on a boundary and there is a free entry position, the new entry is added to the corresponding lookup unit. If there is no free entry (or a threshold number of entries has been exceeded in one embodiment), then the boundary is shifted.

In one embodiment, this shifting of the boundaries between partitions is accomplished as follows. A neighboring boundary B, say to the right of the partition corresponding to the entry to be added, is identified. Let P be the first prefix strictly to the left of boundary path from B to root (ordering of prefixes is defined to be the "post-order" traversal of the Patricia tree). Set new boundary B' to be equal to P1 . . . 1. Now we have reduced the number of internal prefixes in the lookup unit by at least one. All prefixes on B' to root are then inserted into the adjacent lookup unit.

In one embodiment, this shifting of the boundaries between partitions is accomplished as follows. There are two nodes N1 and N2 on the tree and the boundary consists of paths between N1 to root and N2 to root. There is at least one node between N1 and N2 in the Patricia tree which has a value the width of an lookup unit entry (e.g., the node is not a prefix). It is this value that determines the new position of the boundary, and is programmed in the mechanism for generating the enable signals. In one embodiment, the number of prefixes between N1 and N2 is at most sixty-four for width of sizes thirty-two, and therefore, 128 entries are reserved for the boundary prefixes, with some of these being virtual. The lookup units corresponding to the partitions on either side of the new boundary are required to keep prefixes on the new boundary. Thus, if an entry is to be inserted corresponds to a boundary, then it is added to the corresponding lookup unit. Otherwise, if there are free entries or there are entries outside the boundaries, then the entry is added to the corresponding lookup unit. Otherwise, boundaries are shifted to make room for the entry.

In one embodiment, one boundary (N1, N2) either to the right (or left) is identified. The first prefix P strictly to the left (right) of the boundary is then identified. N1 is set to P and N2 is set to the value of the first prefix to the left (right) of the old value of N2. P is then inserted into the corresponding lookup unit, and thus, the number of internal prefixes in the lookup unit in which to add the new entry has been decreased by at least one. The endpoint of the new boundary B' is then equal to some full-width number (e.g., not a prefix) between N1 and N2, and is programmed in the mechanism for generating the enable signals.

Figure 6C:
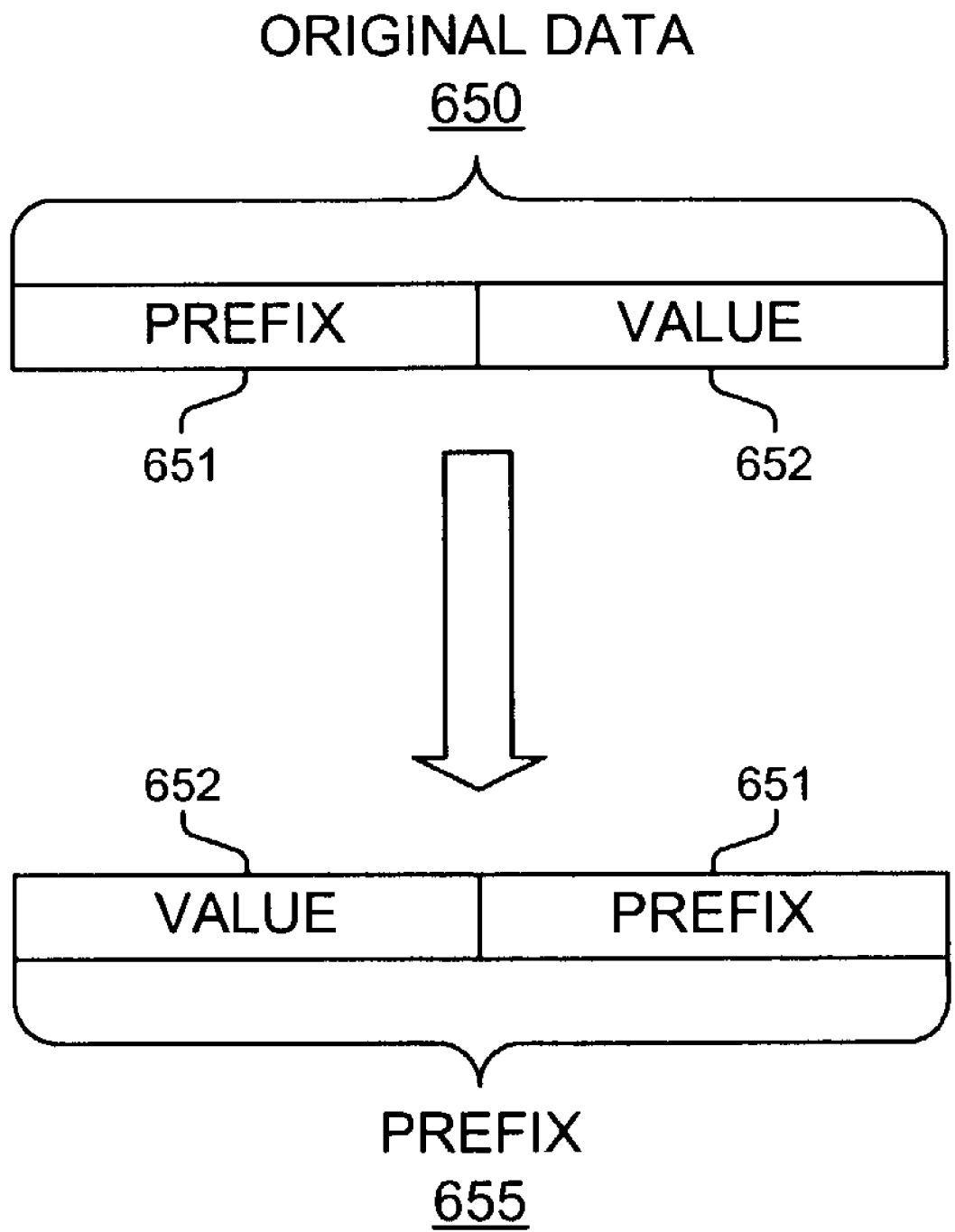
FIG. 6C is a block diagram of a mechanism for mapping a prefix and a value into a prefix for programming in the partitioned space of one embodiment.

As described, some partitioning mechanisms operate using prefixes, such as that illustrated in one embodiment using a Patricia tree. However, not all entries are necessarily a prefix, or are typically defined by a prefix followed by a number, which is not a prefix. FIG. 6C illustrates a mechanism for mapping a prefix and a value into a prefix for programming in the partitioned space of one embodiment. As shown, original data 650 contains a prefix 651 followed by a value 652. By adjusting the ordering of prefix 651 and value 652, a prefix 655 can be created by concatenating value 652 with prefix 651.

This mechanism is especially useful where the lookup is not a simple longest prefix match. For example, in case of virtual private network (VPN) routing, the lookup unit entries corresponding to route entries could be both [VPN, IP prefix] and [*, IP prefix]. Similarly, in the case of IP multicast lookup, the lookup unit entries could be both [IP multicast group G, source IP prefix] and [*, source IP prefix]. The fields of these non-prefix values could then be reordered to produce prefixes, with these prefixes used to populate lookup units as described herein. In one embodiment, two sets of lookup units are used (e.g., with each set typically being partitioned as described herein.) The first set of lookup units is programmed with entries corresponding to [VPN, IP prefix], which are basically prefixes. The second set of lookup units is programmed with entries corresponding to [IP prefix, *], which is obtained by writing the fields in reverse order. In performing a lookup operation, a lookup is performed in both sets of lookup units, with the best matching entry being identified.

Figure 7A:
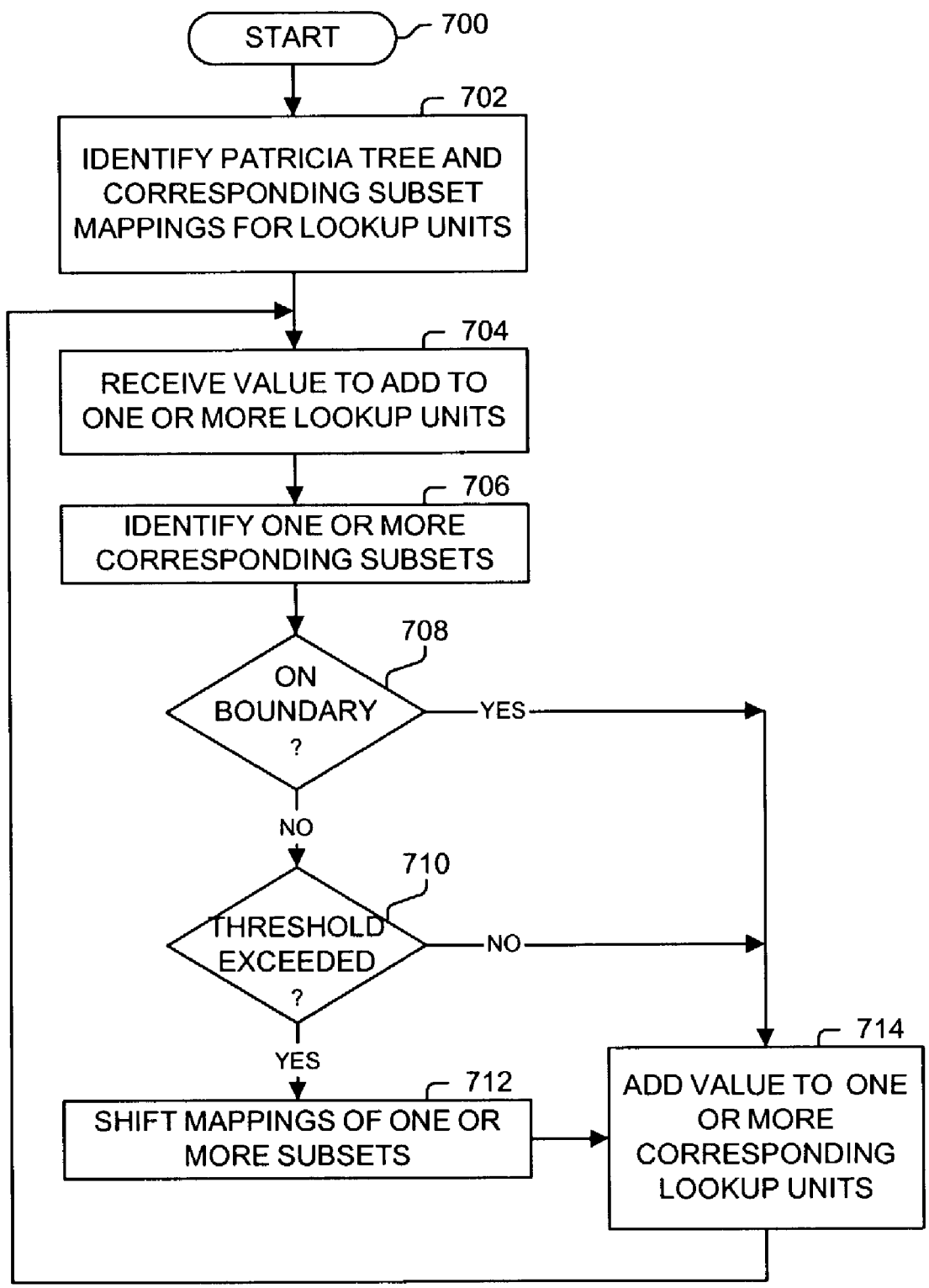
FIGS. 7A-B illustrate processes used in one embodiment for partitioning and repartitioning entries among lookup units.

FIG. 7A illustrates a process used in one embodiment for partitioning and repartitioning entries among lookup units. Processing begins with process block 700, and proceeds to process block 702, wherein a Patricia tree and corresponding subset mappings (i.e., partitions) are identified for each of the lookup units. Next, in process block 704, a value to add to lookup units is received, and in process block 706, its corresponding partition or partitions are identified. As determined in process block 708, if the entry to add does not fall on a boundary, then as determined in process block 710, if a threshold is exceeded (e.g., the occupancy of the corresponding partition is too great—such as there being no free entries), then in process block 712, the mappings of one or more subsets are shifted using any technique, such as those described herein, including, but not limited to that described in relation to FIGS. 6B and 7B. In process block 714, the value is then added to one or more of the corresponding lookup units. Processing then returns to process block 704.

Figure 7B:
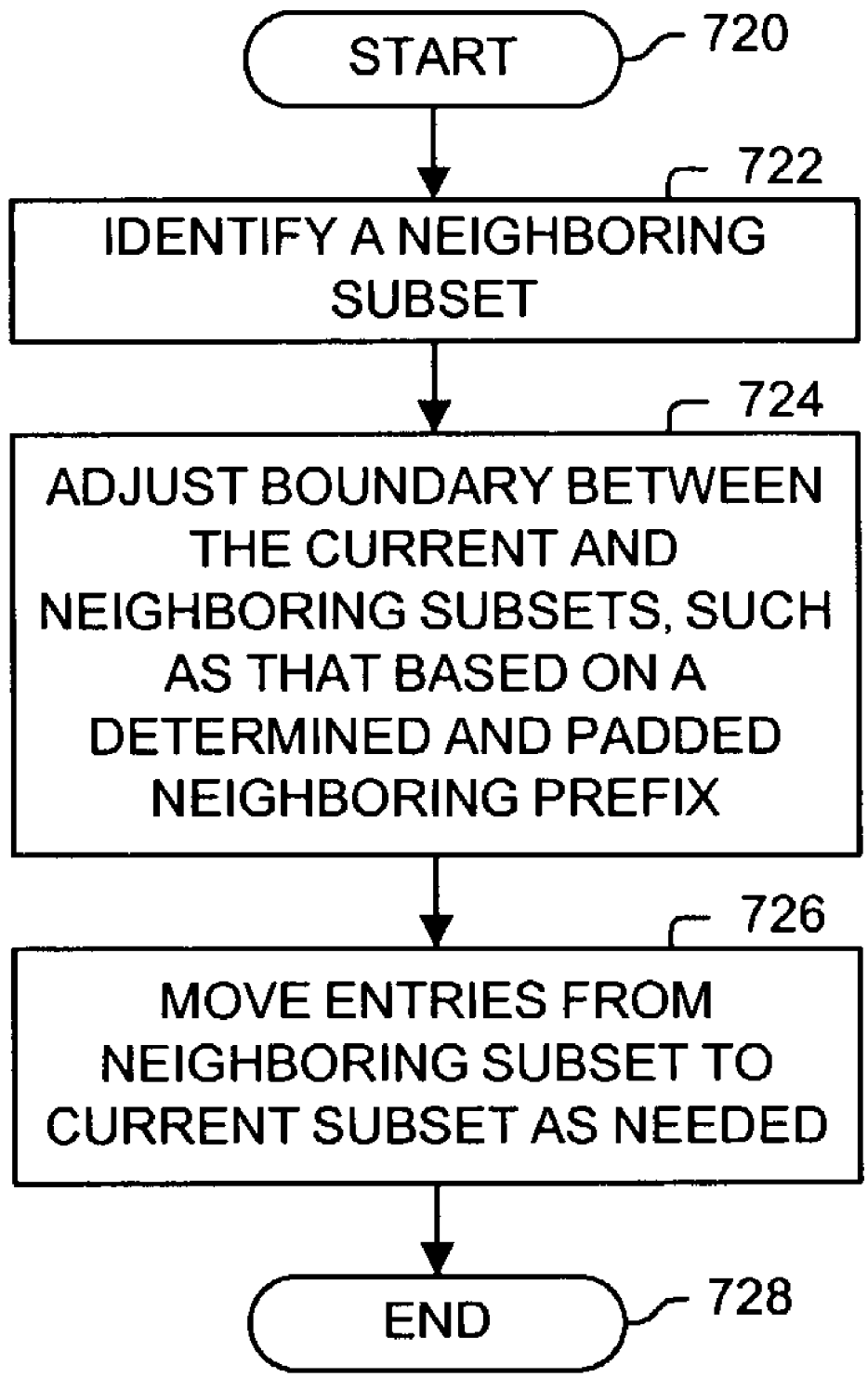

FIG. 7B illustrates a process used in one embodiment to shift the boundaries of neighboring subsets (partitions). Processing begins with process block 720, and proceeds to process block 722, wherein a neighboring subset is identified. Next, in process block 724, the boundary between the current and neighboring subset is adjusted, including, but not limited to that based on a determined and padded neighboring prefix as described herein. In process block 726, as required, entries are moved from the neighboring subset to the current subset and/or added to the current subset as needed. Processing is complete as indicated by process block 728.

Figure 8:
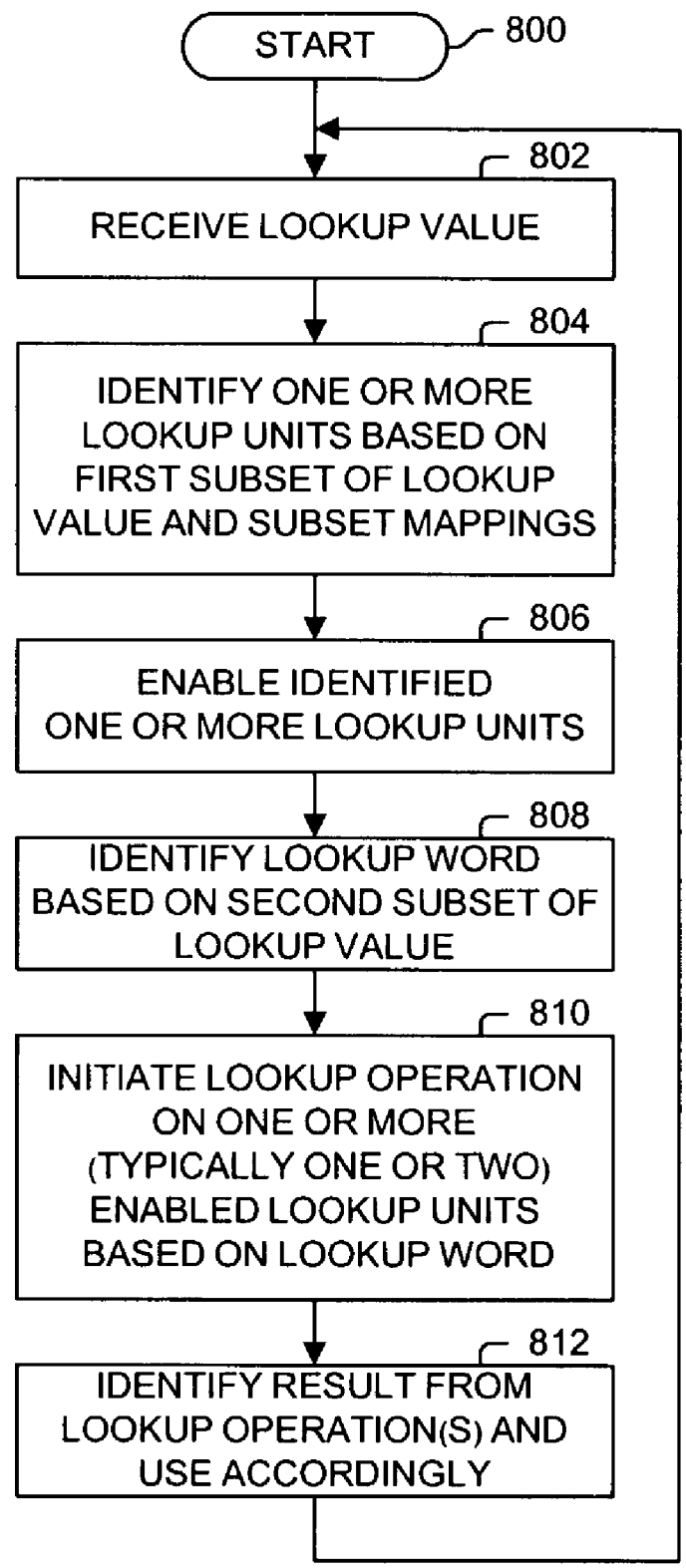
FIG. 8 illustrates a process used in one embodiment for selectively enabling less than all of the lookup units when performing lookup operations to produce a result, which can optionally then be used in the processing of packets.

FIG. 8 illustrates a process used in one embodiment for selectively enabling less than all of the lookup units when performing lookup operations to produce a results, which can optionally then be used in the processing of packets. Processing begins with process block 800, and proceeds to process block 802, wherein a lookup value is received. Next, in process block 804, one or more lookup units are identified based on a first subset of the lookup value and the subset mappings (i.e., partitions). Next, in process block 806, one or more corresponding lookup units are enabled. In process block 808, a lookup word is identified based on a second subset of the lookup value, which may include the entire lookup value. This identification may require processing or simple routing the lookup value or a portion thereof the one or more of the lookup units. Next, in process block 810, a lookup operation is initiated in the enabled one or more lookup units to generate a result (directly or indirectly via memory lookups, manipulation, etc.) In process block 812, the result is used accordingly. Processing returns to process block 802 to repeat this process.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus for use in generating lookup results, the apparatus comprising:
   a plurality of lookup units for generating a lookup result based on a lookup value, each of the plurality of lookup units including a different one of a plurality of subsets of a plurality of entries;
   an enable signal generator, coupled to each of the plurality of lookup units, for selectively enabling less than all of the plurality of lookup units based on the lookup value; and
   control logic for partitioning the plurality of entries into the plurality of subsets of the plurality of entries, and for programming each of the plurality of lookup units with said different one of the plurality of subsets of the plurality of entries;
   wherein said control logic is configured to perform said partitioning based on a Patricia tree representation of the plurality of entries.

2. The apparatus of claim 1, wherein each of the plurality of lookup units includes an associative memory unit.

3. The apparatus of claim 2, wherein the associative memory unit is an associative memory device.

4. The apparatus of claim 2, wherein the associative memory unit is an associative memory bank.

5. The apparatus of claim 4, wherein a single associative memory device includes each of the plurality of lookup units.

6. The apparatus of claim 2, wherein each of the plurality of lookup units corresponds to one or more entries within an associative memory device.

7. The apparatus of claim 1, wherein each of the plurality of lookup units includes a lookup control and a memory device.

8. The apparatus of claim 1, wherein a particular entry of the plurality of entries is included in only one of the plurality of lookup units.

9. The apparatus of claim 1, wherein a particular entry of the plurality of entries is included in at most two of the plurality of lookup units.

10. The apparatus of claim 1, wherein each of the plurality of subsets of the plurality of entries contains approximately the same number of entries.

11. The apparatus of claim 1, wherein said control logic is configured to add entries to one or more of the plurality of subsets.

12. The apparatus of claim 11, wherein said control logic is configured to repartition the plurality of entries into a different plurality of subsets based on an occupancy level of one of the plurality of subsets of the plurality of entries.

13. The apparatus of claim 1, wherein a first lookup unit of the plurality of lookup units includes a first subset of the plurality of entries and a second lookup unit of the plurality of lookup units includes a second subset of the plurality of entries; and
    wherein a particular entry residing on a boundary between the first and the second subsets of the plurality of subsets of the plurality of entries is included in both the first and second lookup units.

14. The apparatus of claim 1, wherein said control logic is configured to repartition the plurality of entries into a different plurality of subsets based on an occupancy level of one of the plurality of subsets of the plurality of entries.

15. The apparatus of claim 14, wherein said repartitioning the plurality of entries includes adjusting a boundary between a first and a second subsets of the plurality of entries.

16. The apparatus of claim 15, wherein the first subset is left of the second subset Patricia tree representation, and wherein said adjusting the boundary includes determining a prefix left of the second subset and setting the boundary to the prefix supplemented with ones.

17. The apparatus of claim 15, wherein the first subset is left of the second subset Patricia tree representation, and wherein said adjusting the boundary includes determining a prefix right of the first subset and setting the boundary to the prefix supplemented with zeros.

18. The apparatus of claim 1, wherein said control logic communicates an enable representation of said partitioning to the enable signal generator.

19. A method for use in determining lookup results, the method comprising:
    programming each of a plurality of lookup units with a different set of entry values;
    selectively enabling less than all of the plurality of lookup units;
    performing a lookup operation using a lookup word on said selectively enabled lookup units; and
    identifying a lookup value
    wherein said selectively enabling is performed based on a first subset of the lookup value; and
    wherein the lookup word includes a second subset of the lookup value.

20. The method of claim 19, wherein each of the plurality of lookup units includes an associative memory unit.

21. The method of claim 20, wherein the associative memory unit is an associative memory device.

22. The method of claim 20, wherein the associative memory unit is an associative memory bank.

23. The method of claim 22, wherein a single associative memory device includes each of the plurality of lookup units.

24. The method of claim 20, wherein each of the plurality of lookup units corresponds to one or more entries within an associative memory device.

25. The method of claim 20, comprising providing the lookup word to each of the plurality of lookup units.

26. The method of claim 20, comprising providing the lookup word to said selectively enabled associative memory devices.

27. The method of claim 19, wherein each of the plurality of lookup units includes a lookup control and a memory device.

28. The method of claim 19, wherein said selectively enabling is performed based on the lookup word.

29. The method of claim 19, wherein each of the plurality of lookup units is programmed with approximately the same number of values from the set of entry values.

30. A method for use in generating lookup results, the method comprising:
    partitioning a space of possible values into a plurality of subsets of the space;
    programming each of a plurality of lookup units with a corresponding one of the plurality of subsets of the space;
    identifying a lookup value;
    selectively enabling less than all of the plurality of lookup units based on the lookup value; and
    providing a lookup word, based on the lookup value, to at least said selectively enabled lookup units;
    wherein said partitioning the space includes deriving a Patricia tree representation of the space of possible values.

31. The method of claim 30, wherein each of the plurality of lookup units includes an associative memory unit.

32. The method of claim 31, wherein the associative memory unit is an associative memory device.

33. The method of claim 31, wherein the associative memory unit is an associative memory bank.

34. The method of claim 33, wherein a single associative memory device includes each of the plurality of lookup units.

35. The method of claim 31, wherein each of the plurality of lookup units corresponds to one or more entries within an associative memory device.

36. The method of claim 31, comprising providing the lookup word to each of the plurality of lookup units.

37. The method of claim 31, comprising providing the lookup word to said selectively enabled associative memory devices.

38. The method of claim 30, wherein each of the plurality of lookup units includes a lookup control and a memory device.

39. The method of claim 30, comprising programming an enable signal generator based on ranges of the plurality of subsets of the space.

40. The method of claim 30, comprising programming a plurality of enable signal generators based on ranges of the plurality of subsets of the space.

41. The method of claim 40, wherein each of the plurality of enable signal generators corresponds to a different one of the plurality of lookup units.

42. The method of claim 30, comprising repartitioning the space of possible values into the plurality of subsets of the space including modifying a boundary between a first and a second subsets of the space.

43. The method of claim 42, wherein the first subset is left of the second subset Patricia tree representation, and wherein said adjusting the boundary includes determining a prefix left of the second subset and setting the boundary to the prefix supplemented with ones.

44. The method of claim 42, wherein the first subset is left of the second subset Patricia tree representation, and wherein said adjusting the boundary includes determining a prefix right of the first subset and setting the boundary to the prefix supplemented with zeros.

45. An apparatus for use in generating lookup results, the apparatus comprising:
  means for partitioning a space of possible values into a plurality of subsets of the space;
  means for programming each of a plurality of means for performing a lookup operation with entries corresponding to one of the plurality of subsets of the space;
  means for selectively enabling less than all of the plurality of said means for performing a lookup operation based on a lookup value; and
  means for performing a lookup operation in said selectively enabled means for performing a lookup operation based on the lookup value;
  wherein said means for partitioning the space includes means for deriving a Patricia tree representation of the space of possible values.

46. The apparatus of claim 45, comprising means for repartitioning the space of possible values into the plurality of subsets of the space includes means for modifying a boundary between a first and a second subsets of the space.

47. An apparatus for use in generating lookup results, the apparatus comprising:
  a plurality of lookup units for generating a lookup result based on a lookup value, each of the plurality of lookup units including a different one of a plurality of subsets of a plurality of entries;
  an enable signal generator, coupled to each of the plurality of lookup units, for selectively enabling less than all of the plurality of lookup units based on the lookup value; and
  control logic for partitioning the plurality of entries into the plurality of subsets of the plurality of entries, and for programming each of the plurality of lookup units with said different one of the plurality of subsets of the plurality of entries;
  wherein said control logic is configured to add entries to one or more of the plurality of subsets, and to repartition the plurality of entries into a different plurality of subsets based on an occupancy level of one of the plurality of subsets of the plurality of entries.

48. A method for use in generating lookup results, the method comprising:
  partitioning a space of possible values into a plurality of subsets of the space;
  programming each of a plurality of lookup units with a corresponding one of the plurality of subsets of the space;
  programming an enable signal generator based on ranges of the plurality of subsets of the space;
  identifying a lookup value;
  selectively enabling less than all of the plurality of lookup units based on the lookup value; and
  providing a lookup word, based on the lookup value, to at least said selectively enabled lookup units.

49. A method for use in generating lookup results, the method comprising:
  partitioning a space of possible values into a plurality of subsets of the space;
  programming each of a plurality of lookup units with a corresponding one of the plurality of subsets of the space;
  programming a plurality of enable signal generators based on ranges of the plurality of subsets of the space;
  identifying a lookup value;
  selectively enabling less than all of the plurality of lookup units based on the lookup value; and
  providing a lookup word, based on the lookup value, to at least said selectively enabled lookup units.

50. The method of claim 49, wherein each of the plurality of enable signal generator corresponds to a different one of the plurality of lookup units.

* * * * *